United States Patent
Horstman et al.

(10) Patent No.: US 8,722,148 B2
(45) Date of Patent: May 13, 2014

(54) COATING COMPOSITIONS WITH ALKOXY-CONTAINING AMINOFUNCTIONAL SILICONE RESINS

(75) Inventors: John Bernard Horstman, Midland, MI (US); Randall Schmidt, Midland, MI (US); Steven Swier, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 198 days.

(21) Appl. No.: 13/513,297

(22) PCT Filed: Dec. 16, 2010

(86) PCT No.: PCT/US2010/060657
§ 371 (c)(1),
(2), (4) Date: Jun. 1, 2012

(87) PCT Pub. No.: WO2011/084556
PCT Pub. Date: Jul. 14, 2011

(65) Prior Publication Data
US 2012/0251729 A1    Oct. 4, 2012

Related U.S. Application Data

(60) Provisional application No. 61/288,620, filed on Dec. 21, 2009.

(51) Int. Cl.
*B05D 3/00*    (2006.01)
(52) U.S. Cl.
USPC ........... 427/386; 427/387; 523/402; 523/414; 523/425; 523/427; 523/433

(58) Field of Classification Search
None
See application file for complete search history.

(56) References Cited

U.S. PATENT DOCUMENTS

| | | | | |
|---|---|---|---|---|
| 5,262,507 A | * | 11/1993 | Decker et al. | 528/38 |
| 5,804,616 A | * | 9/1998 | Mowrer et al. | 523/421 |
| 6,686,008 B1 | * | 2/2004 | Merlin et al. | 428/35.7 |
| 2004/0099845 A1 | * | 5/2004 | Simendinger et al. | 252/389.32 |
| 2005/0148752 A1 | * | 7/2005 | Klaassens et al. | 528/38 |
| 2006/0205861 A1 | * | 9/2006 | Gordon et al. | 524/506 |
| 2011/0190415 A1 | * | 8/2011 | Martin et al. | 523/122 |

FOREIGN PATENT DOCUMENTS

WO    2005010115    2/2005

* cited by examiner

*Primary Examiner* — Erma Cameron
(74) *Attorney, Agent, or Firm* — Catherine U. Brown; Patricia M. Scaduto

(57) ABSTRACT

This invention relates to a coating composition comprising (A) 100 weight parts of at least one epoxy resin; (B) 40 to 900 weight parts of at least one alkoxy-containing aminofunctional silicone resin; (C) up to 50 weight parts of at least one organic hardener; (D) up to 100 weight parts of at least one epoxyfunctional silicone resin; and (E) up to 10 weight parts of at least one cure accelerator, provided the alkoxy-containing aminofunctional silicone resin (B) has a total alkoxy content ranging from 26 to 80 mol percent per mole of silicon (Si) in the alkoxy-containing aminofunctional silicone resin. Methods for preparing the above-described composition and for treating substrates are also disclosed.

15 Claims, No Drawings

COATING COMPOSITIONS WITH ALKOXY-CONTAINING AMINOFUNCTIONAL SILICONE RESINS

CROSS REFERENCE TO RELATED APPLICATIONS

This application is a U.S. national stage filing under 35 U.S.C. §371 of PCT Application No. PCT/US10/60657 filed on Dec. 16, 2010, currently pending, which claims the benefit of U.S. Provisional Patent Application No. 61/288,620 filed Dec. 21, 2009 under 35 U.S.C. §119 (e). PCT Application No. PCT/US10/60657, U.S. Provisional Patent Application No. 61/288,620 are hereby incorporated by reference.

FIELD OF THE INVENTION

The present invention relates to a coating composition comprising (A) 100 weight parts of at least one epoxy resin; (B) 40 to 900 weight parts of at least one alkoxy-containing aminofunctional silicone resin; (C) up to 50 weight parts of at least one organic hardener; (D) up to 100 weight parts of at least one epoxyfunctional silicone resin; and (E) up to 10 weight parts of at least one cure accelerator, provided the alkoxy-containing aminofunctional silicone resin (B) has a total alkoxy content ranging from 26 to 80 mol percent per mole of silicon (Si) in the alkoxy-containing aminofunctional silicone resin. Methods for preparing the above-described composition and for treating substrates are also disclosed.

BACKGROUND OF THE INVENTION

It is known that the addition of aminofunctional silicone resins to coating compositions containing epoxy resins provide improved properties over coatings not including aminofunctional silicone resins. Over time, however, these coatings can crack or become cloudy. Therefore, it would be useful to provide coating compositions containing epoxy resins and aminofunctional silicone resins which have improved weatherability.

BRIEF SUMMARY OF THE INVENTION

The present invention is a coating composition comprising (A) 100 weight parts of at least one epoxy resin; (B) 40 to 900 weight parts of at least one alkoxy-containing aminofunctional silicone resin comprising the units:

$$(R_3Si(OR')_wO_{(1-w)/2})_a \quad \text{(i)}$$

$$(R_2Si(OR')_xO_{(2-x)/2})_b \quad \text{(ii)}$$

$$(RSi(OR')_yO_{(3-y)/2})_c \quad \text{(iii) and}$$

$$(Si(OR')_zO_{(4-z)/2})_d \quad \text{(iv)}$$

wherein each R is independently an alkyl group, an aryl group, or an aminofunctional hydrocarbon group, each R' is independently an alkyl group, a has a value of less than 0.4, b has a value of greater than 0.15, c has a value of greater than zero to 0.8, d has a value of less than 0.2, the value of a+b+c+d=1, w has a value from 0 to less than 1, x has a value from 0 to less than 2, y has a value from 0 to less than 3, z has a value from 0 to less than 4, with the proviso that the alkoxy-containing aminofunctional silicone resin has an —NH-equivalent weight of 100 to 1500; (C) up to 50 weight parts of at least one organic hardener; (D) up to 100 weight parts of at least one epoxyfunctional silicone resin comprising the units:

$$((R^3)_3SiO_{1/2})_e \quad \text{(i)}$$

$$((R^3)_2SiO_{2/2})_f \quad \text{(ii) and}$$

$$((R^3)SiO_{3/2})_g \quad \text{(iii)}$$

wherein $R^3$ is independently an alkyl group having from 1 to 8 carbon atoms, an aryl group having from 1 to 8 carbon atoms, a glycidyl ether group, an alkyl epoxy group, or a cycloaliphatic epoxy group, e has a value of 0.1 to 0.5, f has a value of 0.1 to 0.5, and g has a value of 0.5 to 0.9, with the proviso that the epoxyfunctional silicone resin has an epoxy equivalent weight of 200 to 700; and (E) up to 10 weight parts of at least one cure accelerator, provided the alkoxy-containing aminofunctional silicone resin (B) has a total alkoxy content ranging from 26 to 80 mol percent per mole of silicon (Si) in the alkoxy-containing aminofunctional silicone resin.

The inventors have unexpectedly discovered alkoxy-containing aminofunctional silicone resins provide coating compositions having improved weatherability when the total alkoxy content of the aminofunctional silicone resins ranges from 26 to 80 mol percent per mole of silicon (Si) in the alkoxy-containing aminofunctional silicone resin. These alkoxy-containing aminofunctional silicone resins useful in the invention may also have improved shelf life and a nonvolatile content greater than 85 percent based on the total alkoxy-containing aminofunctional silicone resin weight which can provide additional benefits to these coatings.

The —NH-equivalent weight as used herein means the weight of material that contains one mole of amine hydrogen. The epoxy equivalent weight as used herein means the weight of material that contains one mole of epoxy ethers.

DETAILED DESCRIPTION OF THE INVENTION

This invention is a coating composition comprising (A) 100 weight parts of at least one epoxy resin; (B) 40 to 900 weight parts of at least one alkoxy-containing aminofunctional silicone resin comprising the units:

$$(R_3Si(OR')_wO_{(1-w)/2})_a \quad \text{(i)}$$

$$(R_2Si(OR')_xO_{(2-x)/2})_b \quad \text{(ii)}$$

$$(RSi(OR')_yO_{(3-y)/2})_c \quad \text{(iii) and}$$

$$(Si(OR')_zO_{(4-z)/2})_d \quad \text{(iv)}$$

wherein each R is independently an alkyl group, an aryl group, or an aminofunctional hydrocarbon group, each R' is independently an alkyl group, a has a value of less than 0.4, b has a value of greater than 0.15, c has a value of greater than zero to 0.8, d has a value of less than 0.2, the value of a+b+c+d=1, w has a value from 0 to less than 1, x has a value from 0 to less than 2, y has a value from 0 to less than 3, z has a value from 0 to less than 4, with the proviso that the alkoxy-containing aminofunctional silicone resin has an —NH-equivalent weight of 100 to 1500; (C) up to 50 weight parts of at least one organic hardener; (D) up to 100 weight parts of at least one epoxyfunctional silicone resin comprising the units:

$$((R^3)_3SiO_{1/2})_e \quad \text{(i)}$$

$$((R^3)_2SiO_{2/2})_f \quad \text{(ii) and}$$

$$((R^3)SiO_{3/2})_g \quad \text{(iii)}$$

wherein $R^3$ is independently an alkyl group having from 1 to 8 carbon atoms, an aryl group having from 1 to 8 carbon atoms, a glycidyl ether group, an alkyl epoxy group, or a cycloaliphatic epoxy group, e has a value of 0.1 to 0.5, f has a value of 0.1 to 0.5, and g has a value of 0.5 to 0.9, with the proviso that the epoxyfunctional silicone resin has an epoxy equivalent weight of 200 to 700; and (E) up to 10 weight parts of at least one cure accelerator, provided the alkoxy-containing aminofunctional silicone resin (B) has a total alkoxy content ranging from 26 to 80 mol percent per mole of silicon (Si) in the alkoxy-containing aminofunctional silicone resin.

Component (A) comprises at least one epoxy resin. This epoxy resin can be any epoxy resin having at least two epoxy groups in one molecule, that can be cured by combination with a curing agent. As to its molecular structure and molecular weight, there is no particular restriction. Component (A) is illustrated by diglycidyl ether resin, novolak epoxy resin, o-cresol novolak epoxy resins, phenol novolak epoxy resins, cycloaliphatic epoxy resins, glycidyl ethers of polyvalent phenols such as diglycidyl ether of bisphenol A (DGEBPA) and diglycidyl ether of bisphenol F (DGEBPF), the glycidyl ethers of other bisphenols and glycidyl ethers of mononuclear diphenols such as glycidyl ethers of resorcinol, glycidyl ethers of hydroquinone, and glycidyl ethers of catechol, polyglycidyl ethers of phenol novolak epoxy resins such as phenol formaldehyde novolak, alicyclic epoxy resins derived from the epoxidation of an olefin bond, the product of the reaction of 2,2-bis-(hydroxy-phenyl)-propane (bisphenol A) and epichlorohydrin, triglycidyl isocyanurate, and products obtained from the reaction of bis-(4-hydroxy-phenyl)-methane (bisphenol F) and epichlorohydrin.

Component (A) is more specifically illustrated by resorcinol diglycidyl ether {1,3-bis-(2,3-epoxypropoxy)benzene} marketed, for example, by Wilmington Chemical as HELOXY® 69; DER® 331 a diglycidyl ether of bisphenol A epoxy resin sold by The Dow Chemical Company (Midland Mich.); ERL® 4221D a cycloaliphatic epoxy resin sold by The Dow Chemical Company (Midland, Mich.); triglycidyl p-aminophenol {4-(2,3-epoxypropoxy)-N,N-bis{2,3-epoxypropyl)aniline}; diglycidyl ether of bromobisphenol A {2,2-bis(4-{2,3-epoxypropoxy)3-bromo-phenyl)propane; diglydicylether of Bisphenol F (2,2-bis(p-(2,3-epoxypropoxy)phenyl)methane); triglycidyl ether of meta and/or para-aminophenol (3-(2,3-epoxypro glycidyl ethers of epoxy)N, N-bis(2,3-epoxypropyl)aniline); and tetraglycidyl methylene dianiline (N,N,N',N'-tetra(2,3-epoxypropyl) 4,4'-diaminodiphenyl methane) or mixtures of two or more mixtures of two or more epoxy resins can be used in this invention. A more exhaustive list of the epoxy resins found useful in this invention can be found in Lee, H. and Neville, K., Handbook of Epoxy Resins, McGraw-Hill Book Company, 1982 reissue.

Component (B) comprises at least one alkoxy-containing aminofunctional silicone resin comprising the units:

$(R_3Si(OR')_wO_{(1-w/2)})_a$ (i)

$(R_2Si(OR')_xO_{(2-x/2)})_b$ (ii)

$(RSi(OR')_yO_{(3-y/2)})_c$ (iii) and

$(Si(OR')_zO_{(4-z/2)})_d$ (iv)

wherein each R is independently an alkyl group, an aryl group, or an aminofunctional hydrocarbon group.

Each R in units (i), (ii) and (iii) of Component (B) is independently an alkyl group, an aryl group, or an aminofunctional hydrocarbon group. The alkyl groups of R have from 1 to 18 carbon atoms and are illustrated by methyl, ethyl, propyl, butyl, hexyl, octyl, decyl, dodecyl, hexadecyl, and octadecyl with the alkyl group typically being methyl. The aryl groups have from 6 to 18 carbon atoms and may be substituted with halogen atoms or unsubstituted. The aryl groups are illustrated by phenyl, naphthyl, benzyl, tolyl, xylyl, xenyl, methylphenyl, 2-phenylethyl, 2-phenyl-2-methylethyl, chlorophenyl, bromophenyl and fluorophenyl with the aryl group typically being phenyl. The aminofunctional hydrocarbon group is illustrated by groups having the formula —$R^1NHR^2$ or —$R^1NHR^1NHR^2$ wherein each $R^1$ is independently a divalent hydrocarbon radical having at least 2 carbon atoms and $R^2$ is hydrogen or an alkyl group. Each $R^1$ is typically an alkylene radical having from 2 to 20 carbon atoms, alternatively from 2 to 10 carbon atoms. $R^1$ is illustrated by —$CH_2CH_2$—, —$CH_2CH_2CH_2$—, —$CH_2CHCH_3$—, —$CH_2CH_2CH_2CH_2$—, —$CH_2CH(CH_3)CH_2$—, —$CH_2CH_2CH_2CH_2CH_2$—, —$CH_2CH_2CH_2CH_2CH_2CH_2$—, —$CH_2CH_2CH(CH_2CH_3)CH_2CH_2$—, —$CH_2CH_2CH_2CH_2CH_2CH_2CH_2$—, and —$CH_2CH_2CH_2CH_2CH_2CH_2CH_2CH_2CH_2CH_2$—. The alkyl groups of $R^2$ are as illustrated above for R. When $R^2$ is an alkyl group it is typically methyl.

Typical aminofunctional hydrocarbon groups are —$CH_2CH_2NH_2$, —$CH_2CH_2CH_2NH_2$, —$CH_2CHCH_3NH$, —$CH_2CH_2CH_2CH_2NH_2$, —$CH_2CH_2CH_2CH_2CH_2NH_2$, —$CH_2CH_2CH_2CH_2CH_2NH_2$, —$CH_2CH_2NHCH_3$, —$CH_2CH_2CH_2NHCH_3$, —$CH_2(CH_3)CHCH_2NHCH_3$, —$CH_2CH_2CH_2CH_2NHCH_3$, —$CH_2CH_2NHCH_2CH_2NH_2$, —$CH_2CH_2CH_2NHCH_2CH_2NH_2$, —$CH_2CH_2CH_2CH_2NHCH_2CH_2CH_2NH_2$, —$CH_2CH_2NHCH_2CH_2NHCH_3$, —$CH_2CH_2CH_2NHCH_2CH_2NHCH_3$, —$CH_2CH_2CH_2CH_2NHCH_2CH_2CH_2CH_2NHCH_3$, and —$CH_2CH_2NHCH_2CH_2NHCH_2CH_2CH_3$.

Alternatively, each R is independently selected from alkyl groups having from 1 to 10 carbon atoms, aryl groups having from 6 to 18 carbon atoms, and aminofunctional hydrocarbon groups. Alternatively, each R is independently selected from alkyl groups having from 1 to 4 carbon atoms, aryl groups having from 6 to 8 carbon atoms, and aminofunctional hydrocarbon groups. Alternatively, each R is independently selected from methyl, phenyl, and aminofunctional hydrocarbon groups.

Each R' is independently an alkyl group having from 1 to 8 carbon atoms. Examples of useful R' groups are as described above for R. Alternatively, each R' is an alkyl group having from 1 to 4 carbon atoms, alternatively, each R' is methyl or ethyl.

Subscripts a, b, c, and d in the aminofunctional silicone resin describe the mol fractions of each unit. Subscript a has a value of less than 0.40, alternatively 0 to 0.20, alternatively 0 to 0.10. Subscript b has a value of greater than 0.15, alternatively greater than 0.15 to 0.8, alternatively greater than 0.15 to 0.6. Subscript c has a value of greater than 0 to less than 0.85, alternatively greater than 0 to 0.80, alternatively greater than 0 to 0.70. Subscript d has a value of less than 0.2, alternatively 0 to 0.1, alternatively 0. The sum of the molar fractions of units described by subscripts a+b+c+d=1.

Subscripts w, x, y, and z in the alkoxy-containing aminofunctional silicone resin describe the mol fractions of alkoxy groups in each unit. Subscript w has a value from 0 to less than 1. Subscript x has a value from 0 to less than 2. Subscript y has a value from 0 to less than 3. Subscript z has a value from 0 to less than 4. Total alkoxy content of the alkoxy-containing aminofunctional silicone resin ranges from 26 to 80 mole percent per mole of silicon (Si) in the alkoxy-containing aminofunctional silicone resin, alternatively 30 to 80 mole percent on the same basis, alternatively 30 to 70 mole percent, alternatively 30 to 60 mole percent on the same basis, alternatively 35 to 60 mole percent on the same basis. Total alkoxy content can be determined by multiplying the mol fraction of alkoxy in each aminofunctional silicone resin unit by the mol fraction of that unit and then adding those amounts together. Specifically, by using the composition:

$$(R_3Si(OR')_wO_{(1-w)/2})_a \quad \text{(i)}$$

$$(R_2Si(OR')_xO_{(2-x)/2})_b \quad \text{(ii)}$$

$$(RSi(OR')_yO_{(3-y)/2})_c \quad \text{(iii) and}$$

$$(Si(OR')_zO_{(4-z)/2})_d \quad \text{(iv)},$$

the total alkoxy content=(w a+x b+y c+z d)

The alkoxy-containing aminofunctional silicone resins of Component (B) have an —NH-equivalent weight of 100 to 1500, alternatively 150 to 700, alternatively 200 to 500.

The alkoxy-containing aminofunctional silicone resins of Component (B) generally have a weight average molecular weight (Mw), based on gel permeation chromatography measurements, ranging from 500 g/mol to 10,000 g/mol, alternatively 1,000 to 10,000, alternatively 1,500 to 8,000.

Alkoxy-containing aminofunctional silicone resins useful in the invention generally have improved shelf life. As used herein an alkoxy-containing aminofunctional silicone resin has "improved shelf life" if it does not gel over the course of 8 months at room temperature (25° C.), alternatively if its viscosity increases no more than three times its initial viscosity under the same conditions, alternatively, if its viscosity increases no more than two times its initial viscosity under the same conditions.

In addition, generally, the alkoxy-containing aminofunctional silicone resins useful in the present invention are neat liquids or meltable solids and have high non-volatile content. As used herein the term "non-volatile content" indicates how much of the material will not evaporate as measured by the test method described in the examples. Due to environmental preferences, it is often preferred to use materials having high non-volatile content. Alternatively, the alkoxy-containing aminofunctional silicone resins have a non-volatile content of no less than 85 weight percent based on the total alkoxy-containing aminofunctional silicone resin weight. Alternatively, the alkoxy-containing aminofunctional silicone resins have a non-volatile content of no less than 90 weight percent based on the total alkoxy-containing aminofunctional silicone resin weight.

Generally, the alkoxy-containing aminofunctional silicone resins useful in this invention can be prepared by hydrolytic polycondensation of alkoxysilanes by one of two methods. For example, the hydrolysis of the non-aminofunctional alkoxysilanes can be accomplished via catalysis with strong acid, followed by addition of the aminofunctional silanes and base-catalyzed equilibration of these species to yield the aminofunctional silicone resin. In other cases, the entire hydrolysis can be run under base-catalyzed conditions with the aminofunctional alkoxysilane(s) present from the start. In both cases, the hydrolysis would be followed by distillative removal of by-product alcohol, filtration and removal of solvent to provide the product.

More specifically the alkoxy-containing aminofunctional silicone resins of this invention can be manufactured by preparing a mixture of alkyltrialkoxysilane, diaryldialkoxysilane and aminoalkyldialkoxysilane. This mixture is then hydrolyzed with 1-20 wt % of deionized water, followed by distillative removal of the by-product alcohol. The mixture is then filtered to yield the alkoxy-containing aminofunctional silicone resin. Typically the aryl group is phenyl, the alkyl group is methyl, the alkoxy group is either methoxy or ethoxy, and the amino group is the aminofunctional hydrocarbon group described above.

The alkoxy-containing aminofunctional silicone resins of this invention can also be manufactured by hydrolyzing 20-50 wt % of aryltrialkoxysilane and/or arylalkyldialkoxysilane, catalyzed by 0-0.05 wt % with trifluoromethanesulfonic acid (TFMSA), with deionized water (0-10 wt %), followed by distillative removal of by-product alcohol. Up to 35 wt % of hexamethyldisiloxane (HMDS) and up to10 wt % water is added and the mixture heated to 50-60° C. optionally followed by distillative removal of volatiles. Up to 20 wt % of γ-aminoalkyltrialkoxysilane (APTES), γ-aminoalkylmonoalkoxysilane or γ-aminoalkyldialkoxyalkylsilane are added along with up to 10 wt % water, followed by distillative removal of alcohol. Up to 10 wt % of water and optionally a catalytic amount (to make 0-0.1 wt % KOH) of 1.0 N aqueous potassium hydroxide is added and water removed via azeotrope. If added, the hydroxide was neutralized with 1.0 N aqueous HCl or acetic acid, and water again removed via azeotrope. The mixture was filtered and solvent removed to yield the alkoxy-containing aminofunctional silicone resin. Typically, the aryl group is phenyl, the alkyl group is methyl, the alkoxy group is either methoxy or ethoxy, and the amino group is the aminofunctional hydrocarbon group described above.

The alkoxy-containing aminofunctional silicone resins of this invention can also be manufactured by preparing a mixture of aryltrialkoxysilane, arylalkyldialkoxysilane, and γ-aminoalkyldialkoxyalkylsilane optionally dissolved in xylenes and hydrolyzed with deionized water, followed by distillative removal of by-product alcohol. The resulting product is then reacted with trialkylalkoxysilane, additional xylenes and additional water, followed by azeotropic removal of water. To a portion of this reaction mixture, additional xylene and colloidal silica dispersion are added and the water removed via azeotrope. The mixture is filtered and solvent removed to yield the silicone resin. Typically the aryl group is phenyl, the alkyl group is methyl, the alkoxy group is either methoxy or ethoxy, and the amino group is the aminofunctional hydrocarbon group described above.

The alkoxy-containing aminofunctional silicone resins of this invention can also be manufactured by preparing a mixture of aryltrialkoxysilane and arylalkyldialkoxysilane optionally dissolved in xylenes and hydrolyzed with deionized water, followed by distillative removal of by-product alcohol. The resulting product is then reacted with cyclosilazane. The mixture is filtered and solvent removed to yield the silicone resin. Typically the aryl group is phenyl, the alkyl group is methyl, the alkoxy group is either methoxy or ethoxy, and the amino group is the aminofunctional hydrocarbon group described above.

Component (B) is added in amounts from 40 to 900 weight parts based on 100 parts of Component (A), alternatively 100 to 500 weight parts based on 100 parts of Component (A), alternatively 200 to 400 weight parts on the same basis.

Optional Component (C) is an organic hardener which may provide additional crosslinking. This organic hardener can be any multifunctional primary or secondary polyamine and their adducts, anhydrides, or polyamides. The organic hardener can be any compound with an active group capable of reacting with the epoxy group. It can be selected from compounds with amino, acid, anhydride or azide group. The organic hardener is illustrated by an aromatic diamine such as a diaminodiphenyl-sulfone, a methylenedianiline such as 4,4'-methylenedianiline, a diaminodiphenylether, benzidine, 4,4'-thiodianiline, 4-methoxy-6-m-phenylenediamine, 2,6-diaminopyridine, 2,4-toluenediamine, and dianisidine. Alicyclic amines such as menthane diamine and heterocyclic amines such as pyridine may also be employed. In some cases, aliphatic amines such as secondary alkylamines which are normally fast reacting hardeners can be used alone or in combination with other organic hardeners provided the concentration and/or curing temperature are sufficiently low to permit control of the curing rate. Some preferred commercial organic hardeners are illustrated by Versamine® C-30 a cycloaliphatic amine curing agent sold by Cognis (Cincinnati, Ohio) and Dytek® EP an aliphatic amine curing agent sold by DuPont, (Wilmington, Del.).

Component (C) can be added in amounts up to 50 weight parts based on 100 parts of Component (A), alternatively from 0 to 20 weight parts based on 100 parts of Component (A), alternatively from 0.5 to 20 weight parts based on 100 parts of Component (A).

Optional Component (D) is at least one epoxyfunctional silicone resin comprising the units:

$$((R^3)_3SiO_{1/2})_e \quad \text{(i)}$$

$$((R^3)_2SiO_{2/2})_f \quad \text{(ii) and}$$

$$((R^3)SiO_{3/2})_g \quad \text{(iii)}$$

wherein each $R^3$ is independently an alkyl group, an aryl group, a glycidyl ether group, an alkyl epoxy group, or a cycloaliphatic epoxy group, e has a value of 0.1 to 0.5, f has a value of 0.1 to 0.5, g has a value of 0.5 to 0.9, and e+f+g=1 with the proviso that the epoxyfunctional silicone resin has an epoxy equivalent weight of 200 to 700.

In Component (D), the alkyl groups of $R^3$ have from 1 to 18 carbon atoms and are illustrated by alkyl groups described above for R. The aryl groups of $R^3$ have from 6 to 12 carbon atoms and may be substituted with halogen atoms or unsubstituted. These aryl groups are illustrated by aryl groups described above for R. The glycidyl ether group is illustrated by alkyl glycidyl ether groups such as 2-glycidoxyethyl, 3-glycidoxypropyl, 4-glycidoxybutyl, 2-(3,4-epoxycyclohexyl)ethyl. Examples of the alkyl epoxy groups are 2,3-epoxypropyl, 3,4-epoxybutyl, and 4,5-epoxypentyl, and the cycloaliphatic epoxy group is illustrated by monovalent epoxycycloalkyl groups such as 3,4-epoxycyclohexylmethyl, 3,4-epoxycyclohexylethyl, 3,4-epoxycyclohexylpropyl, 3,4-epoxycyclohexylbutyl, and alkyl cyclohexene oxide groups.

Alternatively, each $R^3$ is independently selected from alkyl groups having from 1 to 8 carbon atoms, aryl groups having from 6 to 8 carbon atoms, a glycidyl ether group, an alkyl epoxy group, and a cycloaliphatic epoxy group hydrocarbon group. Alternatively, each $R^3$ is independently selected from methyl, phenyl, a glycidyl ether group, an alkyl epoxy group, and a cycloaliphatic epoxy group hydrocarbon group.

Subscripts e, f, and g in Component (D) describe the mol fractions of each unit. Subscript e has a value of 0.1 to 0.5, alternatively 0.1 to 0.2. Subscript f has a value of 0.1 to 0.5, alternatively 0.1 to 0.3. Subscript g has a value of 0.5 to 0.9, alternatively 0.3 to 0.9.

The epoxyfunctional silicone resin of Component (D) has an epoxy equivalent weight of 200 to 700, alternatively 300 to 500.

Optional Component (E), the cure accelerator, is a compound that accelerates the reaction between epoxy groups in the epoxy resin and active groups in the hardener. Examples of the cure accelerator include phosphine compounds, such as tributylphosphine, triphenylphosphine, tris(dimethoxyphenyl)phosphine, tris(hydroxypropyl)phosphine and tris(cyanoethyl)phosphine; phosphonium salts, such as tetraphenylphosphonium tetraphenylborate, methyltributylphosphonium tetraphenylborate and methyltricyanoethyl phosphonium tetraphenylborate; imidazoles, such as 2-methyl imidazole, 2-phenyl imidazole, 2-ethyl-4-methyl imidazole, 2-undecyl imidazole, 1-cyanoethyl-2-methyl imidazole, 1,4-dicyano-6-[2-methylimidazolyl-(1)]-ethyl-S-triazine and 2,4-dicyano-6-[2-undecylimidazolyl-(1)]-ethyl-S-triazine; imidazolium salts, such as 1-cyanoethyl-2-undecylimidazolium trimellitate, 2-methylimidazolium isocyanurate, 2-ethyl-4-methylimidazolium tetraphenylborate and 2-ethyl-1,4-dimethylimidazolium tetraphenylborate; amines, such as 2,4,6-tris(dimethylaminomethyl)phenol, benzyl dimethylamine, tetramethylbutyl guanidine, N-methyl piperazine and 2-dimethylamino-1-pyrroline; ammonium salts, such as triethylammonium tetraphenylborate; diazabicyclo compounds, such as 1,5-diazabicyclo(5,4,0)-7-undecene, 1,5-diazabicyclo(4,3,0)-5-nonene and 1,4-diazabicyclo(2,2,2)-octane; and tetraphenylborates, phenol salts, phenol novolak salts and 2-ethylhexanoates of those diazabicyclo compounds, and alcohols such as resorcinol. Dicyandiamide and boron trifluoride can also be used as cure accelerators.

In the coating compositions of this invention the —NH- (amine H) equivalent weight to epoxy ring equivalent weight ratio is typically from 0.8:1 to 1.2:1, alternatively 0.95:1 to 1.05:1.

Although the present description describes having alkoxy content only on the alkoxy-containing amino functional silicone resin, persons skilled in the art would understand that as long as the total alkoxy content is kept within the described ranges, other alkoxy-containing Si resin moieties could be added to the composition (such as a non-amine functional Si resin) which would reduce the actual alkoxy needed on the alkoxy-containing amino functional silicone resin but result in the same total content of alkoxy groups in the composition.

If the coating composition of this invention is formulated as an emulsion it can further comprise at least one surfactant (optional Component (F)). The surfactant may be an anionic, cationic, nonionic, or amphoteric surfactant. The surfactants may be employed separately or in combinations of two or more. Examples of suitable anionic surfactants include alkali metal sulforicinates, sulfonated glyceryl esters of fatty acids such as sulfonated monoglycerides of coconut oil acids, salts of sulfonated monovalent alcohol esters such as sodium oleylisethianate, amides of amino sulfonic acids such as the sodium salt of oleyl methyl tauride, sulfonated products of fatty acids nitriles such as palmitonitrile sulfonate, sulfonated aromatic hydrocarbons such as sodium alpha-naphthalene mono sulfonate, condensation products of naphthalene sulfonic acids with formaldehyde, sodium octahydroanthracene sulfonate, alkali metal alkyl sulfates such as sodium lauryl sulfate, ammonium lauryl sulfate or triethanol amine lauryl sulfate, ether sulfates having alkyl groups of 8 or more carbon atoms such as sodium lauryl ether sulfate, ammonium lauryl ether sulfate, sodium alkyl aryl ether sulfates, and ammonium alkyl aryl ether sulfates, alkylarylsulfonates having 1 or more alkyl groups of 8 or more carbon atoms, alkylbenzenesulfonic acid alkali metal salts exemplified by hexylbenzenesulfonic acid sodium salt, octylbenzenesulfonic acid sodium salt, decylbenzenesulfonic acid sodium salt, dodecylbenzenesulfonic acid sodium salt, cetylbenzenesulfonic acid sodium salt, and myristylbenzenesulfonic acid sodium salt, sulfuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O$ $(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid.

Examples of cationic surfactants include various fatty acid amines and amides and their derivatives, and the salts of the fatty acid amines and amides. Examples of aliphatic fatty acid amines include dodecylamine acetate, octadecylamine acetate, and acetates of the amines of tallow fatty acids, homologues of aromatic amines having fatty acids such as dodecylanalin, fatty amides derived from aliphatic diamines such as undecylimidazoline, fatty amides derived from aliphatic diamines such as undecylimidazoline, fatty amides derived from disubstituted amines such as oleylaminodiethylamine, derivatives of ethylene diamine, quaternary ammonium compounds and their salts which are exemplified by tallow trimethyl ammonium chloride, dioctadecyldimethyl ammonium chloride, didodecyldimethyl ammonium chloride, dihexadecyl ammonium chloride, alkyltrimethylammonium hydroxides such as octyltrimethylammonium hydroxide, dodecyltrimethylammonium hydroxide, or hexadecyltrimethylammonium hydroxide, dialkyldimethylammonium hydroxides such as octyldimethylammonium hydroxide, decyldimethylammonium hydroxide, didodecyldimethylammonium hydroxide, dioctadecyldimethylammonium hydroxide, tallow trimethylammonium hydroxide, coconut oil, trimethylammonium hydroxide, methylpolyoxyethylene cocoammonium chloride, and dipalmityl hydroxyethylammonium methosulfate, amide derivatives of amino alcohols such as beta-hydroxylethylstearylamide, and amine salts of long chain fatty acids.

Examples of nonionic surfactants include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethylene glycol, ethoxylated trimethylnonanols, and polyoxyalkylene glycol modified polysiloxane surfactants.

Examples of the amphoteric surfactants that can be used include amino acid surfactants and betaine acid surfactants.

Typical commercially available surfactants include trimethylnonyl polyethylene glycol ethers and polyethylene glycol ether alcohols containing linear alkyl groups having from 11 to 15 such as 2,6,8-trimethyl-4-nonyloxypolyethylene oxyethanol (6 EO) (sold as Tergitol®TMN-6 by The Dow Chemical Company, Midland, Mich.), 2,6,8-trimethyl-4-nonyloxypolyethylene oxyethanol (10 EO) (sold as Tergitol®TMN-10 by The Dow Chemical Company, Midland, Mich.), alkylene-oxypolyethylene oxyethanol ($C_{11-15}$ secondary alkyl, 9 EO) (sold as Tergitol®15-S-9 by The Dow Chemical Company, Midland, Mich.), alkylene-oxypolyethylene oxyethanol ($C_{11-15}$ secondary alkyl, 15 EO) (sold as Tergitol®15-S-15 by The Dow Chemical Company, Midland, Mich.), octylphenoxy polyethoxy ethanols having varying amounts of ethylene oxide units such as octylphenoxy polyethoxy ethanol (40 EO) (sold as Triton® X405 by Rohm and Haas Company, Philadelphia, Pa.), nonionic ethoxylated tridecyl ethers available from Emery Industries, Mauldin, S.C. under the general tradename Trycol, alkali metal salts of dialkyl sulfosuccinates available from American Cyanamid Company, Wayne, N.J. under the general tradename Aerosol, polyethoxylated quaternary ammonium salts and ethylene oxide condensation products of the primary fatty amines, available from Armak Company, Chicago, Ill. under the tradenames Ethoquad, Ethomeen, or Arquad, and polyoxyalkylene glycol modified polysiloxanes. These preferred surfactants may also be obtained from other suppliers under different tradenames.

Surfactants useful in the invention also include those derived from silicone, sorbitan derivatives, and fatty alcohol derivatives. More specifically, suitable surfactants include, but are not limited to, sorbitan sesquioleate, sorbitan oleate, sorbitan isostearate; alkoxylated alcohols such as ethoxylated fatty alcohols including laureth-4, laureth-7, deceth-12, steareth-10; hydroxylated derivatives of polymeric silicones, such as dimethicone copolyol; alkylated derivatives of hydroxylated polymeric silicones such as cetyl dimethicone copolyol; glyceryl esters such as polyglyceryl-4-isostearate; and mixtures thereof, especially mixtures of hydroxylated derivatives of polymeric silicones, alkylated derivatives of hydroxylated polymeric silicones and glyceryl esters, most especially mixtures of dimethicone copolyol, cetyl dimethicone copolyol and polyglyceryl-4-isostearate. Most preferred is a mixture of such surfactants, i.e. a dimethicone copolyol, sorbitan sesquioleate and laureth-7.

Component (F) can be added to the coating composition in amounts up to 25 weight parts per 100 weight parts of coating composition, alternatively from 1 to 20 weight parts per 100 weight parts of coating composition.

If the coating composition of this invention is formulated as an emulsion, it can further comprise water (Optional Component (G)). Generally, water is present at a level of from 0 to 100 weight parts per 100 weight parts of coating composition, alternatively 20 to 80 weight parts per 100 weight parts of coating composition. When the coating composition is in the form of an emulsion, the emulsion can be spray dried to form a resin/active composite particle.

Coating compositions of the present invention may further comprise other components that are conventionally employed in polymerizable systems. These components include, but are not limited to, preservatives, plasticizers, pigments, colorants, dyes, surfactants, thickeners, heat stabilizers, leveling agents, anti-cratering agents, fillers, sedimentation inhibitors, ultraviolet-light absorbers, and the like. Additives such as promoters, heat stabilizers, ultraviolet-light absorbers, etc. may be intimately dispersed in the reaction mixture and apparently thereby become an integral part of the polymer. Preferred antioxidants are sterically hindered phenolic compounds. Stabilizers such as organic phosphites are also useful. Preferred UV inhibitors are benzotriazole compounds.

The coating compositions of this invention can further comprise at least one filler illustrated by hollow microspheres, fumed silica, precipitated silica, silicic anhydride, hydrous silicic acid, carbon black, ground quartz, calcium carbonate, magnesium carbonate, diatomaceous earth, wollastonite, calcined clay, clay, talc, kaolin, titanium oxide, bentonite, ferric oxide, zinc oxide, glass balloon, glass beads, mica, glass powder, glass balloons, coal dust, acrylic resin powder, phenolic resin powder, ceramic powder, zeolite, slate powder, organic fibers, and inorganic fibers.

The coating compositions of this invention may be prepared by mixing (or mechanically agitating) components (A) and (B), and any optional components, to form a homogenous mixture. This may be accomplished by any convenient mixing method known in the art exemplified by a spatula, mechanical stirrers, in-line mixing systems containing baffles and/or blades, powered in-line mixers, homogenizers, a drum roller, a three-roll mill, a sigma blade mixer, a bread dough mixer, and a two roll mill. The order of mixing is not considered critical.

This invention also relates to a coating composition obtained by a method comprising reacting a coating composition comprising (A) 100 weight parts of at least one epoxy resin; (B) 40 to 900 weight parts of at least one alkoxy-containing aminofunctional silicone resin comprising the units:

$$(R_3Si(OR')_wO_{(1-w)/2})_a \quad \text{(i)}$$

$$(R_2Si(OR')_xO_{(2-x)/2})_b \quad \text{(ii)}$$

$$(R_2Si(OR')_yO_{(3-y)/2})_c \quad \text{(iii) and}$$

$$(Si(OR')_zO_{(4-z)/2})_d \quad \text{(iv)}$$

wherein each R is independently an alkyl group, an aryl group, or an aminofunctional hydrocarbon group, each R' is independently an alkyl group, a has a value of less than 0.4, b has a value of greater than 0.15, c has a value of greater than zero to 0.8, d has a value of less than 0.2, the value of a+b+c+d=1, w has a value from 0 to less than 1, x has a value from 0 to less than 2, y has a value from 0 to less than 3, z has a value from 0 to less than 4, with the proviso that the alkoxy-containing aminofunctional silicone resin has an —NH-equivalent weight of 100 to 1500; (C) up to 50 weight parts of at least one organic hardener; (D) up to 100 weight parts of at least one epoxyfunctional silicone resin comprising the units:

$$((R^3)_3SiO_{1/2})_e \quad \text{(i)}$$

$$((R^3)_2SiO_{2/2})_f \quad \text{(ii) and}$$

$$((R^3)SiO_{3/2})_g \quad \text{(iii)}$$

wherein $R^3$ is independently an alkyl group having from 1 to 8 carbon atoms, an aryl group having from 1 to 8 carbon atoms, a glycidyl ether group, an alkyl epoxy group, or a cycloaliphatic epoxy group, e has a value of 0.1 to 0.5, f has a value of 0.1 to 0.5, and g has a value of 0.5 to 0.9, with the proviso that the epoxyfunctional silicone resin has an epoxy equivalent weight of 200 to 700; and (E) up to 10 weight parts of at least one cure accelerator, provided the alkoxy-containing aminofunctional silicone resin (B) has a total alkoxy content ranging from 26 to 80 mol percent per mole of silicon (Si) in the alkoxy-containing aminofunctional silicone resin. "Reacting" as used herein means mixing components (A) and (B) and any optional components at room temperature (20-25° C.) or heating a mixture comprising components (A) and (B) and any optional components to temperatures above room temperature such as at temperatures of up to 200° C. so the composition cures. Components (A)-(E) are as described above.

This invention also relates to a method of making a coating composition comprising mixing (A) 100 weight parts of at least one epoxy resin; (B) 40 to 900 weight parts of at least one alkoxy-containing aminofunctional silicone resin comprising the units:

$$(R_3Si(OR')_wO_{(1-w)/2})_a \quad \text{(i)}$$

$$(R_2Si(OR')_xO_{(2-x)/2})_b \quad \text{(ii)}$$

$$(RSi(OR')_yO_{(3-y)/2})_c \quad \text{(iii) and}$$

$$(Si(OR')_zO_{(4-z)/2})_d \quad \text{(iv)}$$

wherein each R is independently an alkyl group, an aryl group, or an aminofunctional hydrocarbon group, each R' is independently an alkyl group, a has a value of less than 0.4, b has a value of greater than 0.15, c has a value of greater than zero to 0.8, d has a value of less than 0.2, the value of a+b+c+d=1, w has a value from 0 to less than 1, x has a value from 0 to less than 2, y has a value from 0 to less than 3, z has a value from 0 to less than 4, with the proviso that the alkoxy-containing aminofunctional silicone resin has an —NH-equivalent weight of 100 to 1500; (C) up to 50 weight parts of at least one organic hardener; (D) up to 100 weight parts of at least one epoxyfunctional silicone resin comprising the units:

$$((R^3)_3SiO_{1/2})_e \quad \text{(i)}$$

$$((R^3)_2SiO_{2/2})_f \quad \text{(ii) and}$$

$$((R^3)SiO_{3/2})_g \quad \text{(iii)}$$

wherein $R^3$ is independently an alkyl group having from 1 to 8 carbon atoms, an aryl group having from 1 to 8 carbon atoms, a glycidyl ether group, an alkyl epoxy group, or a cycloaliphatic epoxy group, e has a value of 0.1 to 0.5, f has a value of 0.1 to 0.5, and g has a value of 0.5 to 0.9, with the proviso that the epoxyfunctional silicone resin has an epoxy equivalent weight of 200 to 700; and (E) up to 10 weight parts of at least one cure accelerator, provided the alkoxy-containing aminofunctional silicone resin (B) has a total alkoxy content ranging from 26 to 80 mol percent per mole of silicon (Si) in the alkoxy-containing aminofunctional silicone resin.

This invention also relates to a method of treating substrates comprising applying to a substrate a composition comprising a mixture of Components (A), (B) and any or all optional components. The coating composition will cure through epoxy-amine reactions combined with moisture cure of the alkoxy groups in the amine functional Si resin and etherification reactions between the alkoxy of the amine-functional Si resin and the hydroxyl groups forming in the epoxy-amine system. Cure can be induced at room temperature for long periods of time or at elevated temperature to expedite cure.

Substrates useful in the invention include metals like aluminum and steel as well as plastics. The coating composition can be applied by any method known in the art including spray coating or dipping.

The coating compositions of this invention are useful as a stand alone coating or as ingredients in flame retardant coating compositions, UV resistant coating compositions, paint formulations, powder coatings, architectural coatings and adhesives. The coating compositions of this invention have enhanced weathering resistance, flexibility and gloss, particularly when used in coatings, paints, powder coatings, architectural coatings, and adhesives.

EXAMPLES

The following examples are included to demonstrate embodiments of the invention. However, those of skill in the art should, in light of the present disclosure, appreciate that many changes can be made in the specific embodiments which are disclosed and still obtain a like or similar result without departing from the spirit and scope of the invention.

Test Methods

QUV-A Weatherability (ASTM G-53)

Examples 1-12 coating formulations were mixed on a rotary wheel for 2 hours before drawing down a coating on an Al panel. Coated Al panels were cured for 3 days at 25° C. and 11 days at 60° C. (forced air oven). These cured coatings were placed in the accelerated weathering chamber. Panels were exposed to accelerated weathering in Dew Cycle Weatherometers where both UV radiation, using 340 nm wavelength light, and moisture exposure were combined to offer accelerated weather resistance testing. In particular, 8 hours of QUV exposure at 60° C. followed by 4 hours of condensation at 50° C.

Coatings were evaluated for integrity (pinholes, areas where bare metal is exposed), yellowing, clarity (occurrence of haze over time) and at least 4 gloss values were averaged to get a quantitative measure of coating stability. See Table 1 for results.

Gloss (60 degrees) (ASTM D523-89)

Measured gloss ratings for Examples 1-12 were obtained by comparing the specular reflectance from a sample to that from a black glass standard. A minimum of five readings was taken on the coating surface and the average was reported. See Table 1 for results.

NMR:

The compositions of the various alkoxy-containing aminofunctional silicone resin compositions were determined utilizing NMR. The nuclear magnetic resonance (NMR) analysis was done using a Mercury 400 MHz super conducting spectrometer. The instrument used a silicon-free probe.

Non-Volatile Content (% NVC)—

A few grams of a sample was placed in an aluminum dish, weighed and placed in an convection oven at 105° C. for 1 h. NVC was calculated as: sample weight after heat treatment/sample weight before heat treatment. See Table 1 for results.

Viscosity—

Viscosity was measured at 25° C. using a TA instruments ARES RDA rheometer in steady shear mode using 25 mm parallel plates. Samples were left at room temperature. The initial viscosity was measured 1 day after synthesizing the alkoxy-containing aminofunctional Si resin. The samples were each stored separately in a glass bottle at room temperature. Another data point was taken for each sample every month up to 8 months (or until gelled whichever was earlier). The 8 month value was then divided by the initial viscosity reading and the result reported in Table 1.

Alkoxy Content—

Alkoxy content was calculated by one of two methods. Method one used the ratio of alkoxy to phenyl as measured from $^{13}$C NMR and then multiplying this ratio to the phenyl content as measured from $^{29}$Si NMR. The result obtained was in mol %. Method 2 used the internal standard deuterated chloroform in $^{13}$C NMR. Using the weights of resin and chloroform added to the NMR sample, the weight % alkoxy was determined. Then the mol % alkoxy was calculated using this information in conjunction with the composition obtained from $^{29}$Si NMR.

Molecular Weight

Resins that were analyzed for molecular weight (Mn and Mw) were done using gel permeation chromatography. The samples were prepared in THF at 0.5% concentration, capped with acetic anhydride, filtered and analyzed against polystyrene standards using RI detection. The columns were two 300 mm 5 u Mixed C with a 50 mm guard column. The flow rate was 1 ml/min.

Reagents:

| | |
|---|---|
| Diphenyldimethoxysilane | Gelest |
| Methyltrimethoxysilane | Dow Corning ® Z-6070 |
| Aminopropyltriethoxysilane | Dow Corning ® Z-6011 |
| Phenyltrimethoxysilane | Dow Corning ® Z-6124 |
| Aminopropylmethyldiethoxysilane | Dynasylan 1505 |
| Dimethyldimethoxysilane | Dow Corning ® Z-6194 |
| Hexamethyldisiloxane | Gelest |
| n-Heptane | Fisher Scientific |
| Deionized (DI) water | Building Supply |
| Trifluoromethane sulfonic acid (FC24) | Sigma Aldrich |

For purposes of the following examples:

M denotes $(CH_3)_3SiO_{1/2}$
$D^{Ph}$ denotes $C_6H_5(CH_3)SiO_{2/2}$
$D^{Ph2}$ denotes $(C_6H_5)_2SiO_{2/2}$
$D^{NH2}$ denotes $(CH_3)XSiO_{2/2}$ where X=aminopropyl ($—CH_2CH_2CH_2—NH_2$)
$T^{Me}$ denotes $(CH_3)SiO_{3/2}$
$T^{NH2}$ denotes $XSiO_{3/2}$ where X=aminopropyl ($—CH_2CH_2CH_2—NH_2$)
$T^{Ph}$ denotes $C_6H_5SiO_{3/2}$
OR denotes Alkoxy Preparation of Resins and Coatings Resin 2: $D^{Ph2}_{0.23}T^{NH2}_{0.29}T^{Me}_{0.48}$ 77 mol % OR, Amine Equivalent Weight 232 g/eq NH A 5 L 3-necked round bottom flask was loaded with diphenyldimethoxysilane (1124.1 g, 4.6 mol), methyltrimethoxysilane (1307.7 g, 9.6 mol) and aminopropyltriethoxysilane (1283.9 g, 5.8 mol). The flask was equipped with a thermometer, water-cooled condenser, and an air driven teflon stir paddle. Teflon sleeves were used in all of the glass joints. A nitrogen blanket was applied. 354.9 g of DI water was added slowly starting at room temperature. An exotherm occurred resulting in a temperature rise from 22° C. to 65° C. The reaction mixture was heated at reflux (70° C.) for 1 h and alcohol was distilled off to a pot temperature of 120° C. Residual alcohol was removed at 120° C. under a vacuum of 30 mm Hg for 1 hour. The total amount of alcohol removed in this reaction was 1205 g. The resulting material was pressure filtered through an Osmonics MAGNA Nylon Supported Plain 5 μm filter using nitrogen.

Resin 3: $D^{NH2}_{0.29}D^{Ph2}_{0.23}T^{Me}_{0.48}$ 76 mol % OR, Amine Equivalent Weight 230 g/eq NH A 5-liter 3-necked round-bottomed flask was loaded with methyltrimethoxysilane (1307.7 g, 9.60 mols), diphenyldimethoxysilane (1124.1 g, 4.60 mols), and aminopropylmethyldiethoxysilane (1109.8 g, 5.80 mols). The flask was equipped with an air driven Teflon® stir blade on a glass stir shaft, thermometer, and a water-cooled condenser. Teflon® sleeves were used for all glass joints and a Teflon® stir bearing was used for the glass stir rod. A nitrogen blanket was applied. At room temperature with stirring, DI water (302.67 g, 16.80 mols) was added slowly. The reaction mixture was heated at reflux for 1 hour. A Dean Stark apparatus was inserted and volatiles were removed up to a pot temperature of 120° C. A vacuum of 30 mm Hg was applied for 1 hour while maintaining a pot temperature of 120° C. to remove residual alcohol. Product was cooled to room temperature and filtered through a 5 um filter under nitrogen pressure. Product yield was 2498 g Resin 4: $D_{0.14}T^{Ph}_{0.53}T^{PrNH2}_{0.33}$ 63 mol % OR, Amine Equivalent Weight 197 g/eq NH A resin was prepared, following a synthesis procedure similar to the one used for Resin 2, but using phenyltrimethoxysilane, dimethyldimethoxysilane and aminopropyltrimethoxysilane as silanes.

Resin 5: $D^{Ph2}_{0.32}T^{Me}_{0.68}(OCH_2CH_2NH_2)_{0.29}$ 62 mol % OR, Amine Equivalent Weight 245 g/eq NH:

A 250 mL 3-necked round-bottomed flask was loaded with diphenyldimethoxysilane (78.20 g, 0.320 mols), methyltrimethoxysilane (92.63 g, 0.680 mols), ethanolamine (17.71 g, 0.290 mols), and tetrabutoxytitanate (0.21 g). The flask was equipped with an air driven Teflon® stir blade on a glass stir shaft, thermometer, and a water-cooled condenser. Teflon® sleeves were used for all glass joints and a Teflon® stir bearing was used for the glass stir rod. A nitrogen blanket was applied. The reaction mixture was heated to 55° C. DI water (14.32 g, 0.795 mols) was added slowly. The reaction mixture was then heated at reflux for 1 hour. A Dean Stark apparatus was inserted and volatiles were distilled up to a pot temperature of 150° C. Once 150° C. was reached, this temperature was maintained for 1 hour. The reaction mixture was cooled to 75° C. and then a 10 mm Hg vacuum was applied for 1 hour while maintaining a pot temperature of 75° C. Product was cooled to room temperature and pressure filtered through a 5 μm filter using nitrogen.

Resin 6: $D^{NH2}_{0.29}D^{Ph2}_{0.23}T^{Me}_{0.48}$ 59 mol % OR, Amine Equivalent Weight 221 g/eq NH Synthesis method used was similar to Resin 3, with the appropriate amount of water added to reach the lower alkoxy content.

Resin 7: $D^{NH2}_{0.29}D^{Ph2}_{0.23}T^{Me}_{0.48}$ 41 mol % OR, Amine Equivalent Weight 206 g/eq NH Synthesis method used was similar to Resin 3, with the appropriate amount of water added to reach the lower alkoxy content.

Resin 8: $D^{NH2}_{0.17}D^{Ph2}_{0.35}T^{Me}_{0.48}$ 39 mol % OR, Amine Equivalent Weight 399 g/eq NH:

A 250 mL 3-necked round-bottomed flask was loaded with methyltrimethoxysilane (65.39 g, 0.480 mols), diphenyldimethoxysilane (85.53 g, 0.350 mols), and aminopropylmethyldiethoxysilane (32.53 g, 0.170 mols). The flask was equipped with an air driven Teflon® stir blade on a glass stir shaft, thermometer, and a water-cooled condenser. Teflon® sleeves were used for all glass joints and a Teflon® stir bearing was used for the glass stir rod. A nitrogen blanket was applied. At room temperature (approximately 25° C.) with stirring, DI water (18.74 g, 1.040 mols) was added slowly. The reaction mixture was then heated at reflux for 1 hour. A Dean Stark apparatus was inserted and volatiles were removed up to a pot temperature of 120° C. Reaction mixture was cooled and then some heptanes were added to reduce the viscosity for easy filtration. Reaction mixture was filtered through a 1.2 um filter using nitrogen. Product was stripped on a rotary evaporator at an oil bath temperature of 120° C. and 25 mm Hg.

Resin 9: $D^{NH2}_{0.29}D^{Ph2}_{0.23}T^{Me}_{0.48}$ 25 mol % OR, Amine Equivalent Weight 196 g/eq NH Synthesis method used was similar to Resin 3, with the appropriate amount of water added to reach the lower alkoxy content.

Resin 10: $D^{NH2}_{0.29}D^{Ph2}_{0.23}T^{Me}_{0.48}$ 10 mol % OR, Amine Equivalent Weight 210 g/eq NH Synthesis method used was similar to Resin 3, with the appropriate amount of water added to reach the lower alkoxy content.

Resin 11: $M_{0.25}D^{NH2}_{0.10}D^{Ph2}_{0.35}T^{Ph}_{0.30}$ 5 mol % OR, Amine Equivalent Weight 709 g/eq NH A 5-liter 3-necked round-bottomed flask was loaded with phenyltrimethoxysilane (981.5 g, 4.95 mols), diphenyldimethoxysilane (1411.2 g, 5.78 mols), and hexamethyldisiloxane (392.0 g, 4.83 mols Si). The flask was equipped with an air driven Teflon® stir blade on a glass stir shaft, thermometer, and a water-cooled condenser. Teflon® sleeves were used for all glass joints and a Teflon® stir bearing was used for the glass stir rod. At room temperature with stirring, FC24 (1.39 g, 0.0093 mols) was added followed by the dropwise addition of DI water (107.1 g, 5.945 mols). The reaction mixture was heated at 60° C. for 3 hours. Aminopropylmethyldiethoxysilane (315.7 g, 1.65 mols) was added followed by DI water (428.2 g, 23.77 mols). The reaction mixture was heated at reflux for 3 hours. A Dean Stark apparatus was inserted and 633 g of volatiles were removed. Heptanes (633 g) were added and then another 633 g of volatiles were removed. More heptanes (633 g) were added. Reaction mixture was heated at reflux for 3 hours to body the resin and remove residual water. Resin was cooled to room temperature and filtered through a 0.45 um filter. Solvent was removed on a rotary evaporator at an oil bath temperature of 120° C., 20 mm Hg. Product yield was 2299 g.

Resin 12: $M_{0.25}D^{NH2}_{0.25}D^{Ph2}_{0.25}T^{Ph}_{0.25}$ 1 mol % OR, Amine Equivalent Weight 256 g/eq NH:

A 12-liter 3-necked round-bottomed flask was loaded with phenyltrimethoxysilane (1905.9 g, 9.612 mols), diphenyldimethoxysilane (2348.7 g, 9.612 mols), and hexamethyldisiloxane (913.1 g, 11.25 mols Si). The flask was equipped with an air driven Teflon® stir blade on a glass stir shaft, thermometer, and a water-cooled condenser. Teflon® sleeves were used for all glass joints and a Teflon® stir bearing was used for the glass stir rod. At room temperature with stirring, FC24 (2.58 g, 0.0172 mols) was added followed by the dropwise addition of DI water (181.83 g, 10.09 mols). The reaction mixture was heated at 60° C. for 3 hours. Aminopropylmethyldiethoxysilane (1839.3 g, 9.612 mols) was added followed by DI water (727.31 g, 40.37 mols). Reaction mixture was heated at reflux for 1 hour. A Dean Stark apparatus was inserted and 1637.2 g of volatiles were removed. This amount of volatiles is 60% of the theoretical amount of methanol+ethanol produced+excess water. Heptanes (1730.2 g) were added to dilute the resin to a theoretical resin concentration of 74.5 wt %. Reaction mixture was heated at reflux for 3 hours to body the resin and remove residual water. Resin was cooled to room temperature and filtered through a 0.45 um filter. Solvent was removed on a rotary evaporator at an oil bath temperature of 120° C., ~25 mm Hg. Product yield was 5026 g.

Coating Formulations:

Example 1

Based on the information provided in U.S. Pat. No. 5,804,616 assigned to Ameron an amine-epoxy coating was prepared (referred to in Ameron literature as PSX 700) by mixing on a rotary wheel for 2 hours together a non-amine alkoxy functional silicone resin, an amine functional silane, the epoxy and catalyst (30 g Dow Corning® 3074, 15 g Dow Corning® Z-6011, 25 g Eponex 1510 (Hexion) and 1 g Dibutyl tin dilaurate (DBTDL, Aldrich)). This is the final coating formulation. Alkoxy content of 140 mol percent per mole of Si was calculated based on the alkoxy content of the mixture of 3074 and Z-6011 in the formulation.

Examples 2-12

Resins 2-12 (component 1) were mixed with Eponex 1510 (Component 2, with an epoxy equivalent weight of 212 g/mol epoxy) and Dibutyl tin dilaurate on a rotary wheel for about 2 h. Stoichiometric mixtures were made using the following formula:

Component 1=Amount of grams of alkoxy-containing aminofunctional silicone resin=(1 mol×212 g/mol epoxy)/amine equivalent weight alkoxy-containing aminofunctional silicone resin.

Component 2=1 mol×212 g/mol epoxy of Eponex 1510.

Dibutyl tin dilaurate (DBTDL, Aldrich) was used at 1% of the total solids content of the coating formulation.

TABLE 1

Accelerated Weathering Data/Gloss on Cured Coatings and Viscosity Change and Non-Volatility Data for Resin used in Coatings

| Formulation Examples | Resin | mol % OR in Resin | Initial Gloss | Time at 10% drop in Gloss, h | Gloss after 1000 h | Appearance after 1000 h | initial viscosity Resin, cP | Viscosity after 8 months/ initial viscosity cP | Non volatile content Resin, % |
|---|---|---|---|---|---|---|---|---|---|
| 1 (Comparative) | Aminosilane/non-amine alkoxysilicone resin blend | 140 | 127 | >1000 | 118 | Cracks | <30 | Gelled | <70 |
| 2 | $D^{Ph2}_{0.23}T^{NH2}_{0.29}T^{Me}_{0.48}$ | 77 | 131 | 800 | 119 | Smooth | 282 | 2.2 | 96 |
| 3 | $D^{NH2}_{0.29}D^{Ph2}_{0.23}T^{Me}_{0.48}$ | 76 | 126 | 700 | 120 | Smooth | 49 | 1 | 87 |
| 4 (Comparative) | $D_{0.14}T^{Ph}_{0.53}T^{PrNH2}_{0.33}$ | 63 | 65 | n/a | 62 | Cloudy | 5300 | gelled | no data |
| 5 (Comparative) | $D^{Ph2}_{0.32}T^{Me}_{0.68}(OCH_2CH_2NH_2)_{0.29}$ | 62 | 139 | 400 | 40 | Cloudy | 98 | 2.0 | no data |
| 6 | $D^{NH2}_{0.29}D^{Ph2}_{0.23}T^{Me}_{0.48}$ | 59 | 126 | 800 | 114 | Smooth | 121 | 1.25 | 92 |
| 7 | $D^{NH2}_{0.29}D^{Ph2}_{0.23}T^{Me}_{0.48}$ | 41 | 125 | >1000 | 112 | Smooth | 637 | 1.3 | 97 |
| 8 | $D^{NH2}_{0.17}D^{Ph2}_{0.35}T^{Me}_{0.48}$ | 39 | 138 | 600 | 115 | Smooth | 600 | 1.5 | 98.5 |
| 9 (Comparative) | $D^{NH2}_{0.29}D^{Ph2}_{0.23}T^{Me}_{0.48}$ | 25 | 126 | >1000 | 117 | Smooth | 781 | gelled | no data |
| 10 (Comparative) | $D^{NH2}_{0.29}D^{Ph2}_{0.23}T^{Me}_{0.48}$ | 10 | Resin sample gelled | | | | gelled | gelled | no data |
| 11 (Comparative) | $M_{0.25}D^{NH2}_{0.10}D^{Ph2}_{0.35}T^{Ph}_{0.30}$ | 5 | 129 | 200 | 3.9 | Cloudy, Smooth | 7059 | 1.6 | 98 |
| 12 (Comparative) | $M_{0.25}D^{NH2}_{0.25}D^{Ph2}_{0.25}T^{Ph}_{0.25}$ | 1 | 133 | 400 | 4.2 | Cloudy, Smooth | 41542 | 1.2 | 97 |

We claim:

1. A coating composition comprising (A) 100 weight parts of at least one epoxy resin, wherein the epoxy resin has at least two epoxy groups in one molecule; (B) 40 to 900 weight parts of at least one alkoxy-containing aminofunctional silicone resin comprising the units:

$$(R_3Si(OR')_wO_{(1-w)/2})_a \quad (i)$$

$$(R_2Si(OR')_xO_{(2-x)/2})_b \quad (ii)$$

$$(RSi(OR')_yO_{(3-y)/2})_c \quad (iii)$$ and $$(Si(OR')_zO_{(4-z)/2})_d \quad (iv)$$

wherein each R is independently an alkyl group, an aryl group, or an aminofunctional hydrocarbon group, each R' is independently an alkyl group, a has a value of less than 0.4, b has a value of greater than 0.15, c has a value of greater than zero to 0.8, d has a value of less than 0.2, the value of a+b+c+d=1, w has a value from 0 to less than 1, x has a value from 0 to less than 2, y has a value from 0 to less than 3, z has a value from 0 to less than 4, with the proviso that the alkoxy-containing aminofunctional silicone resin has an —NH— equivalent weight of 100 to 1500, and with the proviso that the alkoxy-containing aminofunctional silicone resin has a total alkoxy content ranging from 26 to 80 mol percent of silicon in the alkoxy-containing aminofunctional silicone resin; (C) up to 50 weight parts of at least one organic hardener; (D) up to 100 weight parts of at least one epoxyfunctional silicone resin comprising the units:

$$((R^3)_3SiO_{1/2})_e \quad (i)$$

$$((R^3)_2SiO_{2/2})_f \quad (ii)$$ and $$((R^3)SiO_{3/2})_g \quad (iii)$$

wherein $R^3$ is independently an alkyl group having from 1 to 8 carbon atoms, an aryl group having from 1 to 8 carbon atoms, a glycidyl ether group, an alkyl epoxy group, or a cycloaliphatic epoxy group, e has a value of 0.1 to 0.5, f has a value of 0.1 to 0.5, and g has a value of 0.5 to 0.9, with the proviso that the epoxyfunctional silicone resin has an epoxy equivalent weight of 200 to 700; and (E) up to 10 weight parts of at least one cure accelerator, provided the alkoxy-containing aminofunctional silicone resin (B) has a total alkoxy content ranging from 26 to 80 mol percent per mole of silicon (Si) in the alkoxy-containing aminofunctional silicone resin.

2. The coating composition of claim 1 wherein for Component (B) c has a value of greater than zero to 0.7.

3. The coating composition of claim 1 wherein the alkoxy-containing aminofunctional silicone resin (B) has a total alkoxy content ranging from 30 to 70 mol percent per mole of silicon (Si) in the alkoxy-containing aminofunctional silicone resin.

4. The coating composition of claim 1 wherein the alkoxy-containing aminofunctional silicone resin (B) has a total alkoxy content ranging from 35 to 60 mol percent per mole of silicon (Si) in the alkoxy-containing aminofunctional silicone resin.

5. The coating composition of claim 1 wherein the alkoxy-containing aminofunctional silicone resin (B) viscosity increases no more than three times its initial viscosity over eight months.

6. The coating composition of claim 1 wherein the alkoxy-containing aminofunctional silicone resin (B) viscosity increases no more than two times its initial viscosity over eight months.

7. The coating composition of claim 1 wherein the alkoxy-containing aminofunctional silicone resin (B) has a non-volatile content of no less than 85 percent based on the total alkoxy-containing aminofunctional silicone resin weight.

8. The coating composition of claim 1 wherein the alkoxy-containing aminofunctional silicone resin (B) has a non-volatile content of no less than 90 percent based on the total alkoxy-containing aminofunctional silicone resin weight.

9. The coating composition of claim 1 wherein the coating composition is in the form of an emulsion.

10. The coating composition of claim 9, further comprising (F) at least one surfactant.

11. The coating composition of claim 10 wherein the surfactant is selected from anionic, cationic, nonionic and amphoteric surfactants.

12. The coating composition of claim 9, further comprising (G) water.

13. A cured coating composition obtained by a method comprising reacting the coating composition of claim 1.

14. A method of treating substrates comprising applying the coating composition of claim 1 to a substrate.

15. The method of claim 14 further comprising reacting the coating composition.

* * * * *